United States Patent
Ala-Luukko et al.

(10) Patent No.: US 6,934,285 B1
(45) Date of Patent: Aug. 23, 2005

(54) METHOD AND SYSTEM FOR TRANSMISSION AND MODIFICATION OF INTELLIGENT NETWORK PARAMETERS

(75) Inventors: Sami Ala-Luukko, Helsinki (FI); Juho Huopaniemi, Espoo (FI); Olli Perä, Oulu (FI)

(73) Assignee: Sonera Oyj, Helsinki (FI)

( * ) Notice: Subject to any disclaimer, the term of this patent is extended or adjusted under 35 U.S.C. 154(b) by 844 days.

(21) Appl. No.: 09/595,828

(22) Filed: Jun. 16, 2000

Related U.S. Application Data

(63) Continuation of application No. PCT/FI98/00983, filed on Dec. 15, 1998.

(30) Foreign Application Priority Data

Dec. 16, 1997 (FI) .................................................. 974531
Dec. 22, 1997 (FI) .................................................. 974604

(51) Int. Cl.⁷ ............................................. H04Q 11/00
(52) U.S. Cl. ....................... 370/384; 370/373; 370/377; 370/385
(58) Field of Search ................................ 370/522, 524, 370/373, 377, 384, 385, 395.1, 410; 379/91.02, 92.04, 93.25, 93.27, 201.01, 221.08, 221.11, 350

(56) References Cited

U.S. PATENT DOCUMENTS 5,887,249 A * 3/1999 Schmid ....................... 455/411
6,064,880 A * 5/2000 Alanara ....................... 455/419
6,088,594 A * 7/2000 Kingdon et al. ............. 455/457
6,131,040 A * 10/2000 Knuutila et al. .......... 455/550.1

FOREIGN PATENT DOCUMENTS

| EP | 0 847 176 A2 | 6/1998 | |
| WO | WO 97/16007 | * 10/1995 | .......... H04L/12/66 |
| WO | WO 97/44943 | * 5/1996 | ............ H04M/3/42 |
| WO | WO 97/06625 | 2/1997 | |
| WO | WO 97/23988 | 7/1997 | |

* cited by examiner

Primary Examiner—Wellington Chin
Assistant Examiner—Mark A Mais
(74) Attorney, Agent, or Firm—Cohen, Pontani, Lieberman & Pavane

(57) ABSTRACT

A method and system for modifying and transmitting intelligent-network service data or service parameters in a telecommunication system comprising an intelligent network, a service control point of the intelligent network, a service data point of the intelligent network, a second telecommunication network and means for connecting the intelligent network to the second telecommunication network. The second telecommunication network is connected via a gateway to the service logic of the service control point and/or to the service data point and a service data parameter and/or the service logic of the intelligent network is modified using a protocol supported by the second telecommunication network. The inventive system includes a gateway for connecting the second telecommunication network to the service logic of the service control point and/or to the service data point, and means for modification of a service data parameter and/or the service logic of the intelligent network using a protocol supported by the second telecommunication network.

16 Claims, 2 Drawing Sheets ies by means of a terminal device# METHOD AND SYSTEM FOR TRANSMISSION AND MODIFICATION OF INTELLIGENT NETWORK PARAMETERS This is a continuation of PCT Application No. PCT/FI98/00983, filed on Dec. 15, 1998, which claims priority from Finland Application Nos.: FI 974531; filed Dec. 16, 1997 and FI 974604 filed Dec. 22, 1997.

BACKGROUND OF THE INVENTION

1. Field of the Invention

The present invention relates to telecommunication systems. In particular, the invention relates to a method and system for modification and transmission of intelligent network service data and/or service data parameters by means of another telecommunication network.

2. Description of Related Art

At present, operators of both wired and mobile telephone networks commonly provide a wide variety of optional or otherwise-available services to their subscribers, such for example as permanent or remotely controlled call transfer, call waiting, suppression of number display (i.e. calling number blocking), advance notice of billing to the subscriber, and like services. These services are generally available at the option of the subscriber, so that the subscriber can decide if and when to use each service. In addition, intelligent network systems utilize a number of other parameters that are preferably modified directly by the subscriber without requiring action by the teleoperator or service provider which would necessitate the use of customer service resources.

In one known system the parameters of intelligent network services are remotely modified via the Internet; this implementation requires, however, that the user have Internet access. Another prior art solution uses a menu service based on tone frequency signals that the user is prompted to input, but relies on a difficult user interface and is slow in use. Moreover, long numerical sequences such as those commonly used in such systems are difficult to visualize, and the SSP centers employed in intelligent network applications are usually able to identify tone frequency signals during call setup but not during the ensuing or resulting call.

The known CAMEL (Customized Applications for Mobile Network Enhanced Logic) architecture utilizes a USSD (Unstructured Supplementary Service Data) based user interface to provide operator-specific intelligent network services, even for subscribers who have moved outside of or beyond the mobile communication network of their home operator under the international roaming system. USSD operations can be used to transmit unstructured supplementary service data between a mobile station and the telecommunication network. The USSD-based user interface that is utilized in conjunction with the CAMEL architecture requires that the service control point (SCP) of the mobile communication network support the MAP (Mobile Application Part) interface in question.

OBJECTS AND SUMMARY OF THE INVENTION

It is accordingly the desideratum of the present invention to eliminate or at least significantly reduce the drawbacks and deficiencies of the prior art, as for example described hereinabove.

It is a particular object of the invention to provide a new method and system to enable a user to remotely control intelligent network services by means of a terminal device connected to another telecommunication network.

The present invention is thus directed to, inter alia, a method for modifying and transmitting intelligent network service data or service parameters in a telecommunication system comprising an intelligent network, a second telecommunication network and means for connecting the intelligent network to the second telecommunication network. The intelligent network includes a service control point (SCP) and a service data point (SDP). In the inventive method, the second telecommunication network is connected via a gateway to the service logic of the service control point and/or to the service data point. A service data parameter and/or the service logic of the intelligent network is modified using a protocol supported by the second telecommunication network. In a preferred implementation, a conversion between a fixed-format message as used in the second telecommunication network and a message format supported by the intelligent network is performed by using a table in the gateway.

In a preferred embodiment, the service data parameter and/or the service logic is/are modified via a write operation performed by the gateway in the service logic of the service control point and/or in the service data point. The second telecommunication network is, in accordance with the invention, preferably an IP (Internet Protocol) based network such as the Internet, or a digital mobile communication network such as a GSM (Global System for Mobile Communications) network.

The invention additionally provides a method in which, in a telecommunication system as described above, the second telecommunication network is connected via the gateway to the service logic of the service control point of the intelligent network, and the intelligent network service data parameter or service logic is modified using a protocol supported by the second telecommunication network. In an embodiment of this method, a conversion between a fixed-format message as used in the second telecommunication network and a message format supported by the service control point of the intelligent network is performed using a table in the gateway. The service data parameter and/or service logic is preferably modified via a write operation performed by the gateway in the service logic of the intelligent network service control point.

The invention further provides a method for modifying an intelligent network service parameter in a telecommunication system as described above, in which the service parameter is transmitted using a terminal device in the form of a text message to the gateway, and the text message is converted in the gateway into the format of an intelligent network service parameter and transmitted to the data point of the intelligent network. In an embodiment of this method, an acknowledgement message is returned from the intelligent network data point to the gateway, and the acknowledgement message is converted into the form of a text message and sent to the terminal device. The record to be modified in the intelligent network data point is preferably identified in the gateway by the calling subscriber number transmitted in the text message signaling. The record to be modified in the intelligent network data point may also be identified in the gateway by the contents of the text message.

In various respective implementations, the information may be transmitted between the terminal device and the gateway in the form of a short message, or by using the USSD-MAP protocol, or by using the WAP (Wireless Application Protocol) protocol. In a GSM mobile telephone system, the short-message service allows transmission of text messages from a mobile station to another terminal even if the receiver is not reachable at that time, and a text message sent as a short message may have a maximum length of 160 characters. The WAP protocol defines a standard for applications that provide services for wireless network terminal equipment; by using WAP, it is possible to connect, as for example with Internet servers, by telephone.

The invention is additionally directed to a telecommunication system for modification and transmission of intelligent network service data or service parameters, the system comprising an intelligent network, a second telecommunication network and means for connecting the intelligent network to the second telecommunication network. The intelligent network includes a service control point and a service data point. The system further comprises a gateway for connecting the second telecommunication network to the service logic of the service control point and/or to the service data point of the intelligent network, and means for modification of a service data parameter and/or the service logic of the intelligent network using a protocol supported by the second telecommunication network. In one embodiment, the gateway comprises table means for performing or implementing a conversion between a fixed-format message supported by the second telecommunication network and a message format supported by the intelligent network. The gateway preferably comprises means for carrying out a write operation in the service logic of the service control point or in the service data point of the intelligent network, and means for modification of the service data parameter and/or service logic. The second telecommunication network in the system of the invention is, by way of preferred example, an IP-based network or a digital mobile telephone network.

The present invention also provides a telecommunication system for modification of intelligent network services or service logic, the system comprising an intelligent network, a second telecommunication network and means for connecting the intelligent network to the second telecommunication network. The intelligent network includes a service control point. The system further comprises a gateway for connecting the second telecommunication network to the service logic of the service control point of the intelligent network and means for modification of a service data parameter and/or the service logic of the intelligent network using a protocol supported by the second telecommunication network. The gateway preferably comprises table means for performing or implementing a conversion between a fixed-format message supported by the second telecommunication network and a message format supported by the intelligent network. In one embodiment, the gateway comprises means for carrying out a write operation in the service logic of the service control point of the intelligent network and means for modification of the service data parameter and/or service logic. The second telecommunication network in the system is preferably, by way of example, an IP-based network or a digital mobile telephone network.

The invention additionally provides a telecommunication system for modification of an intelligent network service parameter, said system comprising an intelligent network, a digital mobile telephone network, means for connecting the intelligent network to the mobile telephone network, and terminal equipment connected to the mobile telephone network. The intelligent network includes a service data point. The system further comprises means for sending a service parameter in the form of a text message from the terminal equipment to a gateway, and means for converting the text message in the gateway into the format of an intelligent network service parameter and transmitting it to the data point of the intelligent network. The system preferably includes means for returning an acknowledgement message from the intelligent network data point to the gateway, and means for converting the acknowledgement message in the gateway into the form of a text message and sending it to the terminal equipment.

In a preferred embodiment of this inventive system, the gateway comprises means by which the intelligent network data point record to be modified is identified by the calling subscriber number, i.e. the A-number, which is transmitted in the text message signaling. In another embodiment, the system comprises means for identifying the record by the contents of the text message. The system preferably includes means for transmitting information from the terminal equipment to the gateway, as for example in the form of a short message, using the USSD or the WAP protocol.

The present invention advantageously enables implementation of the user interface between intelligent network services and the user with the existing service development properties of the service control point. The user interface can accordingly be implemented in a significantly more flexible manner than by identification of tone frequency signals, as in the prior art. Using the short message service, a mobile telephone subscriber can modify his or her services at any time that the user is reachable via the telecommunication network. The invention also permits communication between a GSM subscriber and an intelligent network in a telecommunication network other than the GSM network, as for example the service logic of a wired telephone network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters identify similar elements throughout the several figures.

DETAILED DESCRIPTION OF THE CURRENTLY PREFERRED EMBODIMENTS

Figure 1:
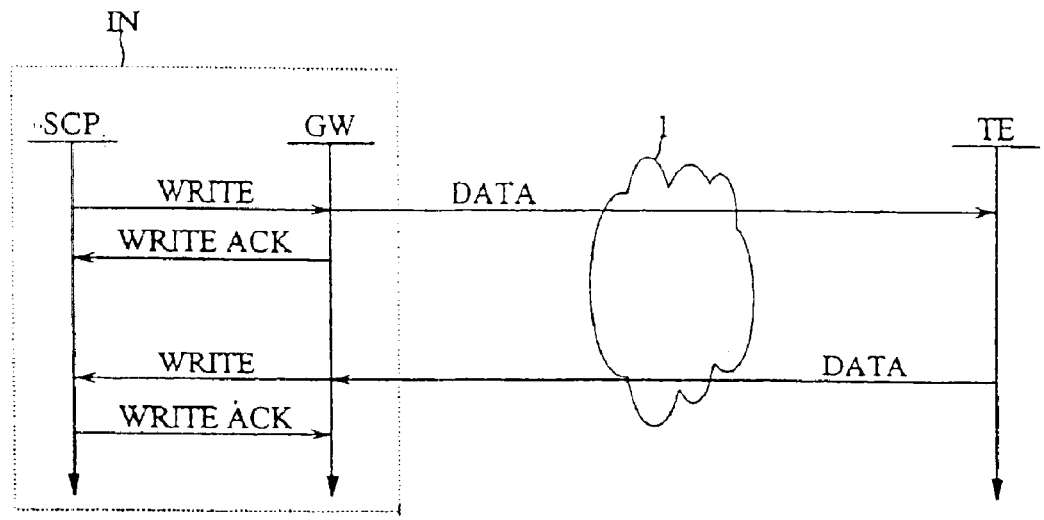
FIG. 1 diagrammatically illustrates an example of signaling in accordance with a first embodiment of the present invention.
Figure 3:
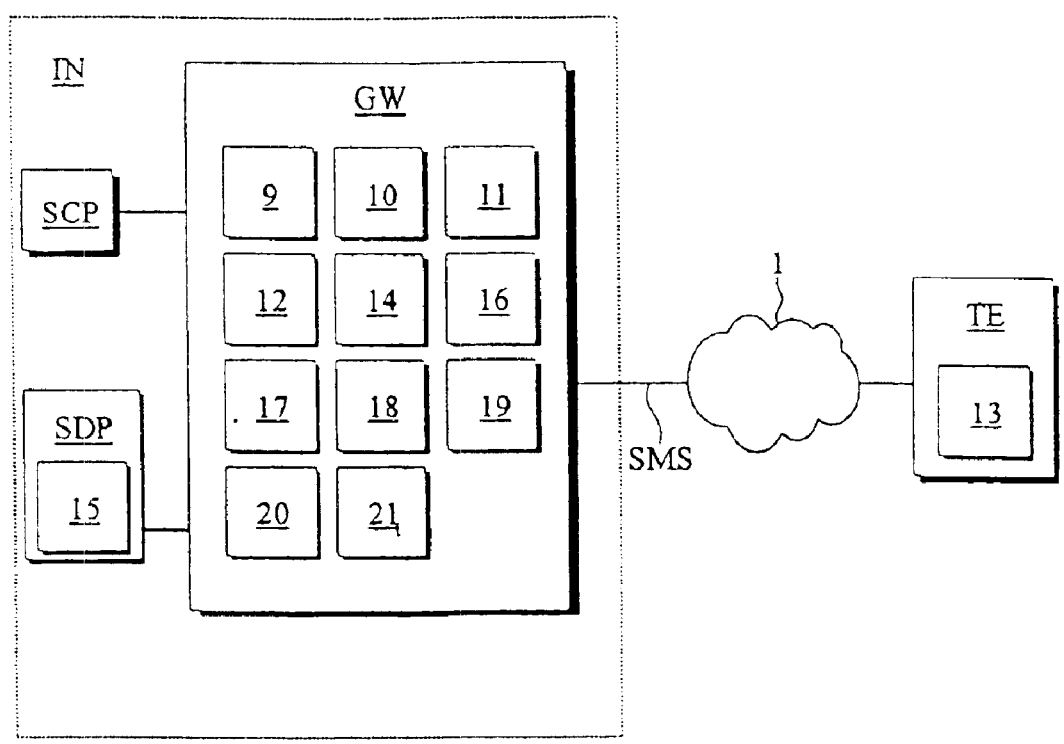
FIG. 3 diagrammatically illustrates a system in accordance with the invention.

Shown by way of example in FIG. 1 is an illustrative signaling procedure and methodology in accordance with the invention between a service control point SCP of an intelligent network and a subscriber/user's terminal equipment TE. The gateway GW includes means for its connection to the service control point SCP and to a second telecommunication network 1 (FIG. 3). The second telecommunication network 1 may, for example, be a digital mobile communication network or the Internet. When the service control point SCP sends information or a request to the terminal equipment TE, it is transmitted to the gateway GW, as for example using a WRITE message. If the gateway GW supports transmission of information, such as in text form, then the service control point can generate this type of information itself, in which case the gateway GW will only have to convert the information into a form or format compatible with the properties of the second telecommunication network 1. In one currently-contemplated embodiment, the service control point SCP indicates, using a suitable indicator such as a number, a list in the gateway GW to define the type of message being transmitted. This procedure is particularly advantageous when the particular gateway GW does not support any other form or transmission of numeric data. The gateway thus sends the information DATA via the second telecommunication network 1 to the terminal equipment TE.

To transmit the information DATA from the user's terminal equipment TE to the service control point SCP, the user applies network-specific properties. In the GSM system, for example, such a property may be a short message or USSD. The second telecommunication network 1 transmits this information DATA to the gateway GW, which modifies it into a database interface operation understood by the service control point SCP. If the service control point SCP does not support transmission of data other than numeric information, then gateway GW may be provided with a table for converting fixed-format messages into database interface operations.

Figure 2:
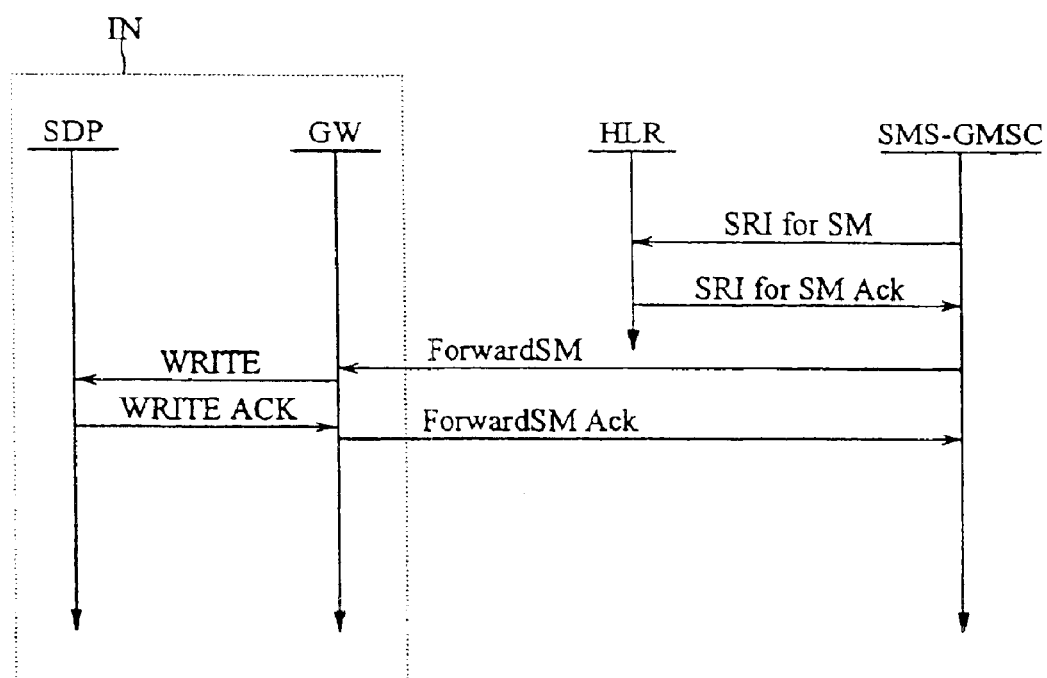
FIG. 2 diagrammatically illustrates an example of signaling in accordance with another embodiment of the invention.

In the signaling example of FIG. 2, an intelligent network service parameter is changed using the short-message service of a digital mobile telephone network. The user sends a short message to a service number. The short message contains fixed-format information for modifying the service parameter. For example, the letter "D" may denote deactivating of the intelligent network service parameter, and the letter "A" may denote activating of the parameter. In the operator's network, the short message is transmitted to the gateway GW, which updates the relevant data in the database of the service data point SDP. A subscriber in the digital mobile telephone network sends a short message, which is transmitted in accordance with the GSM standard, to a short message service center SC. The short message service center SC sends the message to the SMS-GMSC, which performs an HLR (Home Location Register) inquiry based on the B-number defined by the subscriber. The Home Location Register HLR may for example be a GSM system database containing information that includes subscriber data, subscriber location data, call control data, short-message services and billing data. The "B-number" identifies the receiver of the short message.

In this illustrative situation, the subscriber has selected a B-number value that points to a specific gateway GW. Gateway GW receives the short message sent by the SMS-GMSC and examines the A-number contained therein to determine the subscriber whose intelligent network parameters it has to change. By using this information and analyzing the contents of the short message, the gateway GW knows which record in the database of the services data point SDP is to be changed. Gateway GW then performs a WRITE operation that the service data point in question will understand. When the intelligent network service is next activated, the service control point SCP can check the user-defined parameter value in the service data point SDP.

FIG. 2 represents an exchange of messages between the Home Location Register HLR of the SMS-GMSC and the gateway GW in accordance with the GSM MAP protocol. The write operation of the database interface being used is applied between the gateway GW and the service control point SCP. The two lowermost messages shown in FIG. 2 are applied if, as in the figure, the calling subscriber is to be given optional information as to whether or not the database write operation was successful.

In an embodiment of the invention, the gateway GW is also operable for responding to an MAP-SendRoutinglnfoForSM inquiry with its own address, in which case the SMS-GMSC sends the short message to gateway GW. All of the functionalities associated with the service are now in the same database interface.

FIGS. 3 diagrammatically depicts a system implementation in accordance with the present invention. The terminal device TE is connected via the second telecommunication network 1 to the gateway GW. The terminal equipment TE comprises means 13 for transmitting a service parameter in the form of a text message SMS to the gateway GW. The text message SMS may be a short message or, by way of example, a message consistent with the USSD or WAP protocol, a byte-oriented or a document-oriented message. Gateway GW is connected to the network components of or associated with or forming the intelligent network IN, the service control point SCP and the service data point SDP.

Gateway GW comprises means 9 and 14 for modification of an intelligent network service data parameter and/or service logic using a protocol supported by the second telecommunication network 1. Gateway GW further comprises table means 10 for performing or implementing a conversion between a fixed-format message supported by the second telecommunication network 1 and a message format supported by the intelligent network IN. Means 11 are used to carry out the write operation and means 12 to modify the data in the service logic of the service control point SCP and/or in the service data point SDP. Using means 15, the service data point returns an acknowledgement message to gateway GW, which includes means 16 for further converting the acknowledgement message into text message format and sending it to the terminal equipment TE. Means 19 are used to transmit information between the terminal equipment TE and the database interface in the form of a short message, means 20 using the USSD protocol and means 21 using the WAP protocol. To identify the record to be modified in the service data point SDP, gateway GW utilizes means 17 for identification by the A-number and means 18 for identification by the contents of the text message.

The functionality of gateway GW is seen by service control point SCP as that resembling service data point SDP. Data flowing through the database interface is simple numeric data, which is converted by gateway GW into a fixed-format message and applied to the interface connecting to the second telecommunication network 1. The gateway may be implemented as an independent device or as a part of the service control point SCP or the service data point SDP. The invention can be implemented, as a general matter of design choice, in many types of systems supporting SS7 and/or other protocols.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures We is claimed is:

1. A method for modifying an intelligent network service parameter of an existing subscriber record in a telecommunication system comprising an intelligent network, a service data point of the intelligent network, a digital mobile telephone network, a gateway for connecting the intelligent network to the mobile telephone network, and a terminal device connected to the mobile telephone network, comprising the steps of:

transmitting the service parameter, as a text message by means of the terminal device, to the gateway;

converting, in the gateway, the transmitted text message to a service parameter format of the intelligent network; and transmitting the converted service parameter from the gateway to the service data point for modifying the existing subscriber record in accordance with the converted service parameter.

2. The method of claim 1, further comprising the steps of:

returning an acknowledgement message from the service data point to the gateway in response to receipt by the service data point of the converted service parameter;

converting, into a text message format, the converted service parameter received by the service data point; and transmitting the text message format converted service parameter from the service data point to the terminal device.

3. The method of claim 1, further comprising the step of identifying, in the gateway, the record to be modified in the service data point by using a calling subscriber number of the text message transmitted by means of the terminal device.

4. The method of claim 1, further comprising the step of identifying, in the gateway, the record to be modified in the service data point by using contents of the text message transmitted by means of the terminal device.

5. The method of claim 1, wherein text messages are transmitted between the terminal device and the gateway as short messages.

6. The method of claim 1, wherein information is transmitted between the terminal device and the gateway using USSD protocol.

7. The method of claim 1, wherein information is transmitted between the terminal device and the gateway using WAP protocol.

8. The method of claim 1, wherein the text message contains a fixed format message, whereby said step of transmitting a service parameter is executable without a prompt from the intelligent network.

9. In a telecommunication system for modifying an intelligent network service parameter of an existing subscriber record and including an intelligent network, a service data point of the intelligent network, a digital mobile telephone network, a gateway for connecting the intelligent network to the mobile telephone network, and terminal equipment connected to the mobile telephone network, means for transmitting the service parameter, as a text message, from the terminal equipment to the gateway; and means, in the gateway, for converting the transmitted text message to a service parameter format of the intelligent network and for transmitting the converted service parameter from the gateway to the service data point for modifying the existing subscriber record in accordance with the converted service parameter.

10. In the system of claim 9, means for returning an acknowledgement message from the service data point to the gateway in response to receipt by the service data point of the converted service parameter; and second means for converting, into a text message format, the converted service parameter received by the service data point and for transmitting, from the service data point to the terminal equipment, the text message format converted service parameter.

11. In the system of claim 9, said gateway comprising means for identifying the record in the service data point to be modified using a calling subscriber number of the text message transmitted from the terminal equipment.

12. In the system of claim 9, said gateway comprising means for identifying the record in the service data point to be modified using contents of the text message service parameter.

13. In the system of claim 9, means for transmission of information between the terminal equipment and the gateway using short messages.

14. In the system of claim 9, means for transmission of information between the terminal equipment and the gateway using USSD protocol.

15. In the system of claim 9, means for transmission of information between the terminal equipment and the gateway using WAP protocol.

16. The method of claim 9, wherein the text message contains a fixed format message, whereby the transmission of the service parameter by said means for transmitting a service parameter is executable without a prompt from the intelligent network.

* * * * *